(12) United States Patent
Kapaan et al.

(10) Patent No.: US 6,837,818 B1
(45) Date of Patent: Jan. 4, 2005

(54) CONTINUOUSLY VARIABLE TRANSMISSION SYSTEM

(75) Inventors: Hendrikus Jan Kapaan, Nieuwegein (NL); Johannes Albertus Van Winden, Heidelberg (DE); Bernardus Gerardus Van Leeuwen, Nieuwegein (NL); Arno Stubenrauch, Aidhausen (DE); Hubert Herbst, Gaedheim (DE)

(73) Assignee: SKF Engineering and Research Centre B.V., Nieuwegein (NL)

( * ) Notice: Subject to any disclaimer, the term of this patent is extended or adjusted under 35 U.S.C. 154(b) by 12 days.

(21) Appl. No.: 10/049,881
(22) PCT Filed: Aug. 25, 2000
(86) PCT No.: PCT/NL00/00592

§ 371 (c)(1),
(2), (4) Date: Feb. 19, 2002

(87) PCT Pub. No.: WO01/16507
PCT Pub. Date: Mar. 8, 2001

(30) Foreign Application Priority Data

Aug. 27, 1999  (NL) ............................................. 1012927

(51) Int. Cl.[7] ............................. F16H 37/02; F16H 3/44
(52) U.S. Cl. ...................................... 475/210; 475/302
(58) Field of Search .......................... 192/995; 475/210, 475/208, 209, 271, 280, 293, 302

(56) References Cited

U.S. PATENT DOCUMENTS

| 5,052,990 A | * 10/1991 | Sakakibara et al. ......... 475/210 |
| 5,569,108 A | * 10/1996 | Cadee et al. .................... 475/1 |
| 5,827,146 A | * 10/1998 | Yan et al. .................... 475/210 |
| 6,010,422 A | * 1/2000 | Garnett et al. ................. 475/5 |
| 6,050,379 A | * 4/2000 | Lyon ......................... 192/54.1 |
| 6,113,515 A | * 9/2000 | Salecker et al. .............. 477/72 |

FOREIGN PATENT DOCUMENTS

| DE | 196 27 980 A | 1/1997 |
| GB | 2 217 405 A | 10/1989 |
| GB | 2 113 783 A | 8/1993 |

* cited by examiner

Primary Examiner—Tisha D Lewis
(74) Attorney, Agent, or Firm—Oliff & Berridge, PLC

(57) ABSTRACT

A continuously variable transmission system comprises a continuously variable transmission having two pulley sets each with two discs defining a V-shaped groove, drive means-for varying the width of said groove and a belt extending between said-pulley sets in the grooves thereof, as well as a forward-reverse control connected to the shaft of one of the pulley sets and a clutch connected to said forward-reverse control, said pulley sets, forward-reverse control and clutch each being provided with a respective actuator. The actuators of the forward-reverse control and of the clutch are of an electromechanical type.

14 Claims, 3 Drawing Sheets

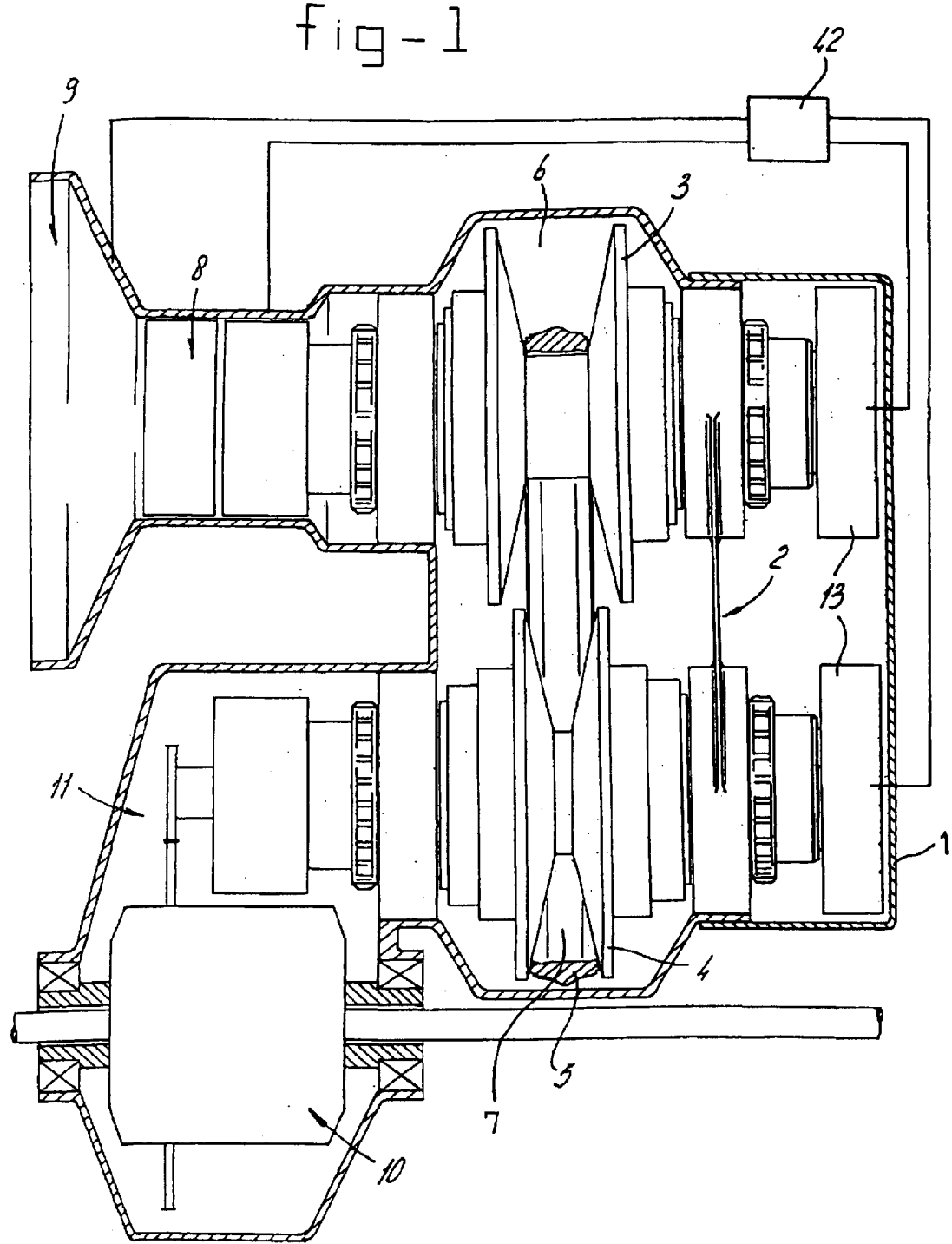

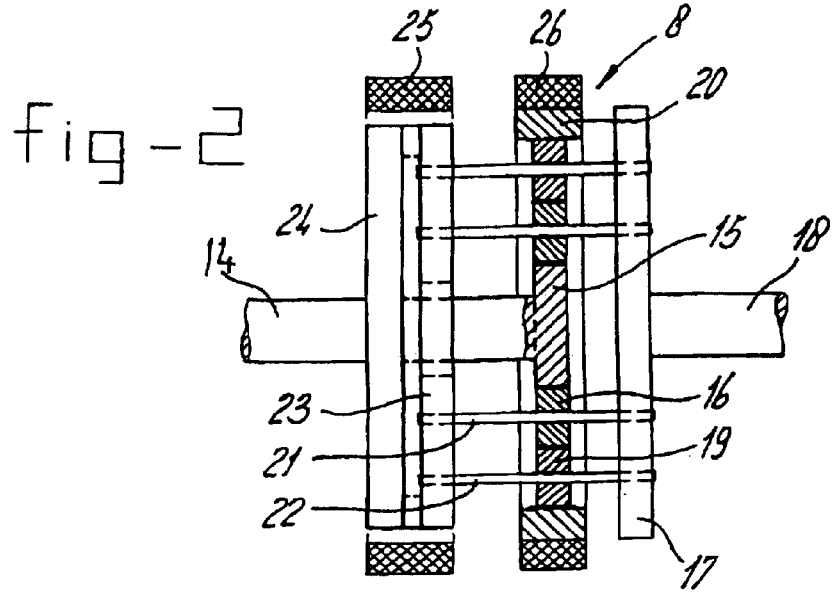

CONTINUOUSLY VARIABLE TRANSMISSION SYSTEM

BACKGROUND OF THE INVENTION

1. Field of Invention

The invention is related to a continuously variable transmission system.

2. Description of Related Art

Such continuously variable systems, which are for instance applied in the automotive industry, usually have hydraulic control means for controlling the transmission ratio. Also the clutch is usually controlled hydraulically. Often, the forward-reverse control is of a purely mechanical type.

In the automotive field, attempts are made to replace hydraulic controls by electric or electro-mechanical controls. Such replacement would first of all increase the overall efficiency of the system, as it is not necessary to apply a high pressure pump therein. Also, it would solve the problem of environmental pollution because no hydraulic oil is required. Furthermore, lightweight and reliable systems are preferred. Also the possibility of imparting "smart" functions in the transmission management is an advantageous feature of electric or electro-mechanical controls.

SUMMARY OF THE INVENTION

Although mechanically actuated and electrically controlled continuously variable transmissions are known per se, no fully electro-mechanical system exists. The object of the invention is to provide a continuously variable transmission system, which lacks any hydraulic controls. This object is achieved in that, the actuators of the forward-reverse control and of the clutch are of an electro-mechanical type.

As all control functions of the continuously variable transmission system according to the invention are now of an electro-mechanical type, it is possible to achieve a full integration of the control functions for the transmission ratio, the clutch and the forward-reverse control.

Therefore the invention provides a continuously variable transmission system including two pulley sets each with two discs defining a V-shaped groove and with drive means for varying the width of said groove, a belt extending between said pulley sets in the grooves thereof, a forward-reverse control connected to the shaft of one of the pulley sets, and a clutch connected to said forward-reverse control, said pulley sets, forward-reverse control and clutch each being provided with a respective actuator.

The clutch may comprise an actuator having a screw mechanism which is driveable by means of an electromotor. The forward-reverse control may be carried out in several ways. According to a preferred embodiment, the forward-reverse control comprises a satellite gear wheel system consisting at least of a sun wheel, two sets of satellite gear wheels which are accommodated on a planet carrier, the first set thereof engaging the sun wheel and the second set thereof, said second set engaging a ring gear, which satellite gear wheel mechanism provides a reverse rotational sense of the sun wheel with respect to the rotational sense of the planet carrier, as well as a switching means for either driving the sun wheel through the satellite gear wheels, or directly through the planet carrier.

In this embodiment, a first coupling is provided for switching the ring gear between a freely rotatable position and a fixed position, and a second coupling for switching the sun wheel and the planet carrier between a mutually fixed position and a mutually rotatable position. Said couplings may be carried out as electro-mechanical couplings.

Furthermore, the actuator of each pulley set may comprise a screw mechanism. The pulley sets are symmetric with respect to a plane of symmetry situated in the grooves of said pulley sets, one pulley set at one side being coupled to the forward-reverse control and the clutch, the other pulley set at the same side being coupled to a differential mechanism.

A very compact embodiment of the complete continuously variable transmission system can now be obtained in case the differential is coupled to its pulley set through gear wheels, said differential overlapping said pulley set in such a way that the wheel drive shafts run parallel next to said pulley set. Alternatively, the drive wheel shafts may run perpendicular to said pulley set.

The compactness of the continuously variable transmission system is further enhanced in that the pulley sets can be fully symmetric with respect to the grooves in question, and the actuators are accommodated in the shaft of each pulley.

BRIEF DESCRIPTION OF THE DRAWINGS

The invention will now be described further with reference to the embodiments shown in the figures, wherein:

FIG. 1 shows the general layout of a continuously variable transmission system according to the invention;

FIG. 2. shows the electro-mechanical forward-reverse control as applied in said system;

FIG. 3. shows the electro-mechanical clutch as applied in said system; and

DETAILED DESCRIPTION OF PREFERRED EMBODIMENTS

Figure 4:
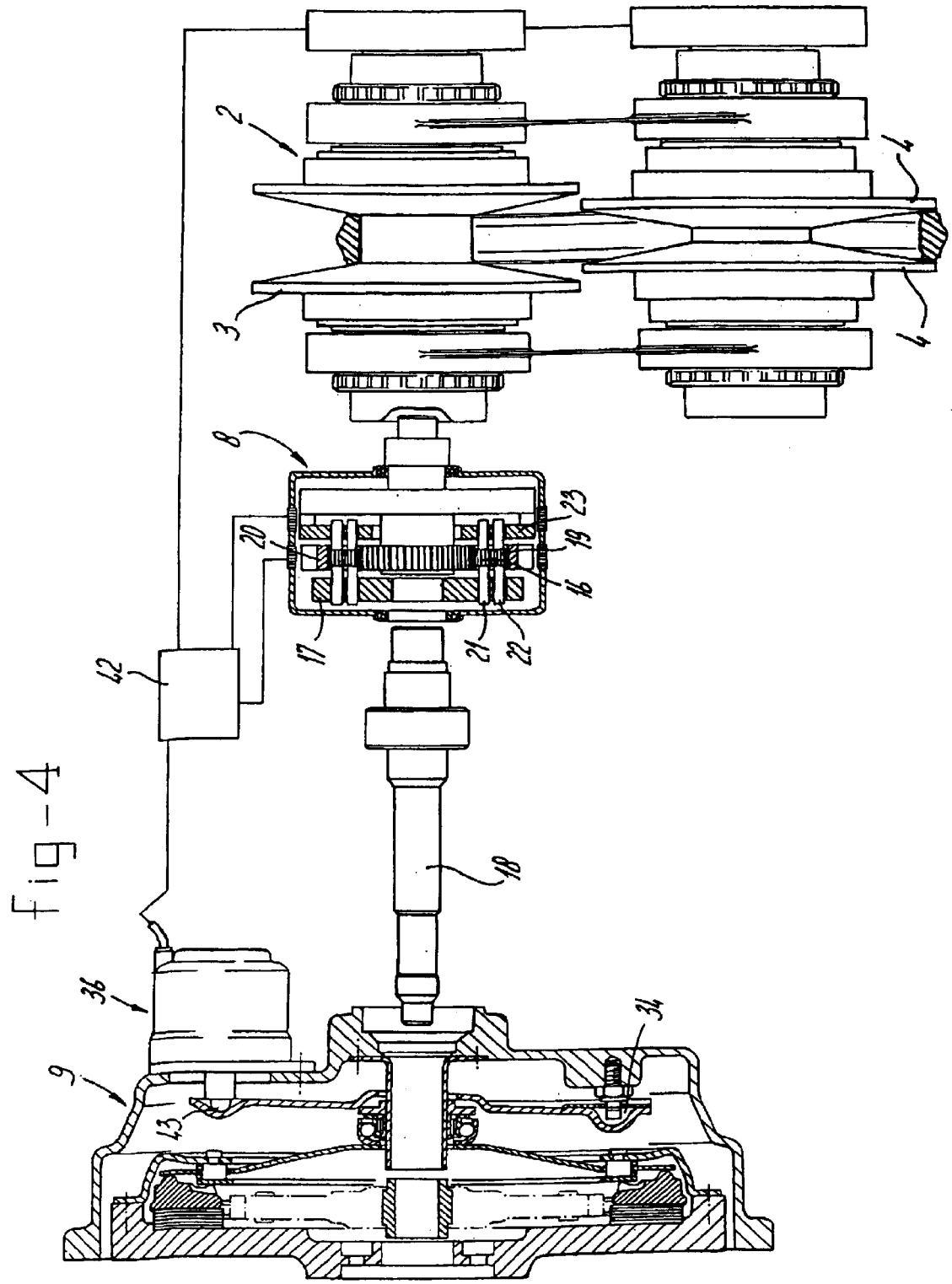
FIG. 4 shows an exploded view of the system.

The continuously variable transmission system according to FIG. 1 comprises a housing 1, which contains a continuously variable transmission 2. Said continuously variable transmission 2 comprises a drive pulley set 3, a driven pulley set 4, as well as a belt 5 accommodated in the V-shaped grooves 6, 7 of said pulley sets 3, 4.

The drive pulley set 3 is connected to an engine (not shown) through a forward-reverse control 8 as well as through a clutch 9.

The driven pulley set 4 is connected to a differential 10 through a gear wheel set 11.

The pulley sets 3, 4 are each provided with internal screw mechanisms (not shown), which are controlled each by control mechanisms 13.

The forward-reverse control 8 as shown in FIG. 2 is of an electro-mechanical type. Said forward-reverse control 8 has an input or drive shaft 18, connected to the clutch 9. The output or driven shaft 14 carries a sunwheel 15 which engages a first set of satellite gear wheels 16. Said satellite gear wheels 16 are carried by a planet carrier 17, which in turn is connected to the input or drive shaft 18 of the forward-reverse control 8. The output shaft 14 is connected to the drive pulley set 3.

The forward-reverse control 8 furthermore comprises a second set of satellite gear wheels 19, which on the one hand engages the first set of satellite gear wheels 16, as well as a ring gear 20.

The first and second satellite gear wheel sets 16, 19 are freely rotatable on shafts 21, 22 which on the one hand are connected to the planet carrier 17, and on the other hand to a first coupling disc 23. The output or driven shaft 14 carries a second coupling disc 24. The first and second coupling discs 23, 24 may be brought into or out of engagement with respect to each other by means of a first electro-mechanical coupling 25.

Furthermore, a second electro-mechanical coupling 26 is provided for bringing the ring gear 20 into or out of a freely rotatable position.

The first and second couplings 25, 26 are alternatively engaged, or simultaneously released, as will be explained now. In FIG. 2, the second electro-magnetic coupling 26 is engaged, which means that ring gear 20 is held non-rotatable. The first electro-magnetic coupling 25 is in its release position, which means that the first coupling disc 23 is freely rotatable with respect to the second coupling disc 24.

The input or drive shaft 18 now drives the output or driven shaft 14 in reverse direction through the satellite gear wheel sets 16, 19 and the non-rotatable ring gear 20.

In contrast, input shaft 18 drives output shaft 14 in the same direction in case the first coupling 25 is engaged, and the second coupling 26 is disengaged. In that case, the ring gear is allowed to rotate freely, whereas the first and second coupling disc 23, 24 are mutually connected, and are driven by the planet carrier 17 through the shafts 21, 22.

Furthermore, both the first coupling 25 and the second coupling 26 may be disengaged at the same time. This would yield a neutral position, wherein no connection exist between the input shaft 18 and the output shaft 14.

The clutch 9 as shown in FIG. 3 is connected to the input shaft 18 of the forward-reverse control according to FIG. 2: see FIG. 1. On the other hand, the clutch 9 is connected to motor shaft 27, which carries a flange 28 having friction plates 29. The coupling ring 30 frictionally engages the friction plates 29, said coupling ring 30 being held clamped onto the friction plates 29 through disc spring 31. The disc spring 31 through thrust bearing 32 is supported against the control lever 33, which with pivot end 34 is supported with respect to the clutch housing 35.

At its other end, the control lever 33 is actuated by means of an electro-mechanical screw actuator 36.

In the position shown in FIG. 3, the screw actuator 36 is retracted, which means that the disc spring 31 exerts a compressive force which presses the coupling ring 30 onto the friction plates 29.

Upon actuating of the electro-mechanical actuator 36, the control lever 33 is pivoted to the left in FIG. 3, thus pushing the central part of disc spring 31 towards motor shaft 27. The outer ring 37 of the disc spring 31 thus moves away from the motor shaft 27 as a result of the pivotal support 38, and releases the coupling ring 30 from the friction plates 29, thus uncoupling the motor shaft 27 from the input shaft 18.

The electro-mechanical actuator 36 comprises an electro-motor 39, which drives the screw mechanism 40. The screw 41 of said screw mechanism engages the control lever 33 by means of ball joint 43.

The screw mechanisms may be either ball screw mechanisms or roller screw mechanisms.

The complete continuously variable transmission system is governed by an integrated control device 42, as shown in FIG. 1. Said control device 42 is connected to the control mechanisms 13 of the pulley sets 3, 4, as well as to the forward-reverse control 8 and the clutch 9. From sensors incorporated in these components, the control device 42 receives signals, which are processed in the control device 42 so as to output suitable control signals for governing the complete system. Additional signals which may be fed to the control device for processing therein encompass, e.g., vehicle speed, engine speed, accelerator pedal position, braking action, slopes of the vehicle, vehicle acceleration, etcetera.

In FIG. 4, the modular lay-out of the continuously variable transmission system is shown. The clutch 9, forward-reverse control 8 and continuously variable transmission 2 each are separate modules, interconnectable by output shaft 14 and input shaft 18.

What is claimed is:

1. Continuously variable transmission system, comprising:
   a continuously variable transmission having two pulley sets, each with two discs defining a V-shaped groove;
   drive means for varying the width of the groove;
   a belt extending between the pulley sets in the grooves thereof;
   a forward-reverse control connected to the shaft of one of the pulley sets; and
   a clutch connected to the forward-reverse control, wherein the pulley sets, the forward-reverse control, and the clutch are each provided with a respective actuator, the actuators of the forward-reverse control and of the clutch are of an electro-mechanical type, and the continuously variable transmission system lacks any hydraulic controls.

2. Continuously variable transmission system according to claim 1, wherein the clutch comprises an actuator having a screw mechanism which is driveable by means of an electromotor.

3. Continuously variable transmission system according to claim 1, the forward-reverse control comprising:
   a satellite gear wheel system consisting at least of a sun wheel, and two sets of satellite gear wheels accommodated on a planet carrier, wherein a first set of the two sets of satellite gear wheels engages both the sun wheel and a second set of the two sets of satellite gear wheels, and the second set engages a ring gear, and a satellite gear wheel mechanism, the satellite gear wheel mechanism providing a reverse rotational sense of the sun wheel with respect to the rotational sense of the planet carrier; and
   a switching means for either driving the sun wheel through the satellite gear wheels or driving the sun wheel directly through the planet carrier.

4. Continuously variable transmission system according to claim 3, wherein a first coupling is provided for switching the sun wheel and the planet carrier between a mutually fixed position and a mutually rotatable position and a second coupling for switching the ring gear between a freely rotatable position and a fixed position.

5. Continuously variable transmission system according to claim 4, wherein the first and second couplings are electro-mechanical couplings.

6. Continuously variable transmission system according to claim 1, wherein the actuator of each pulley set comprises a screw mechanism.

7. Continuously variable transmission system according to claim 6, wherein the pulley sets are symmetric with respect to a plane of symmetry situated in and substantially parallel to the grooves of the pulley sets, one pulley set at one side being coupled to the forward-reverse control and the clutch, and the other pulley set being coupled to a differential mechanism.

8. Continuously variable transmission system according to claim 7, wherein the differential mechanism is coupled to its pulley set through gear wheels, the differential mechanism overlapping its pulley set in such a way that the wheel shafts run parallel and next to the differential mechanism's pulley set, or are perpendicular to the differential mechanism's pulley set.

9. Continuously variable transmission system according to claim 7, wherein the pulley sets each have a hollow shaft accommodating a screw mechanism.

10. Continuously variable transmission system according to claim 1, wherein control means are provided for controlling the drive means of the pulley sets, the forward-reverse control and the clutch.

11. Continuously variable transmission system according to claim 1, wherein the drive means of the pulley sets, the forward-reverse control and the clutch are in a closed loop configuration with the control means.

12. Continuously variable transmission system according to claim 1, wherein the forward-reverse control, the clutch, and the continuously variable transmission are each comprised in seperate modules.

13. Continuously variable transmission system according to claim 1, wherein the belt is a push belt or a pull belt of metallic or non-metallic components.

14. Continuously variable transmission system according to claim 1, wherein each pulley set is provided with a control means for controlling the drive means.

* * * * *